United States Patent
Gillespie et al.

[11] Patent Number: 6,158,409
[45] Date of Patent: Dec. 12, 2000

[54] TWO-STROKE ENGINE PISTON BOWL CONFIGURATIONS

[75] Inventors: George T. Gillespie, Littlehampton, United Kingdom; Peter W. Brown, Lake Villa, Ill.; Francis A. McGinnity, Hartland; Theodore J. Holtermann, Brookfield, both of Wis.; Robert L. Niemchick, Lake Villa, Ill.; Erik R. Jorgensen, Burlington, Wis.; Gregory J. Binversie, Grayslake, Ill.; Paul W. Breckenfeld, Kenosha, Wis.; Wolfram Hellmich, Munich, Germany

[73] Assignee: Outboard Marine Corporation, Waukegan, Ill.

[21] Appl. No.: 08/952,704

[22] PCT Filed: Mar. 19, 1997

[86] PCT No.: PCT/US97/04442

§ 371 Date: Nov. 19, 1997

§ 102(e) Date: Nov. 19, 1997

[87] PCT Pub. No.: WO97/35102

PCT Pub. Date: Sep. 25, 1997

Related U.S. Application Data

[60] Provisional application No. 60/013,673, Mar. 19, 1996, and provisional application No. 60/020,896, Jun. 27, 1996.

[51] Int. Cl.[7] .................................................. F02B 17/00
[52] U.S. Cl. ........................ 123/193.6; 123/276; 123/305
[58] Field of Search .................................... 123/260, 276, 123/295, 298, 278, 289, 290, 305, 193.6

[56] References Cited

U.S. PATENT DOCUMENTS

| | | |
|---|---|---|
| 1,679,831 | 8/1928 | Lang . |
| 2,457,652 | 12/1948 | Fisher ....................................... 123/276 |
| 2,644,433 | 7/1953 | Anderson . |
| 2,682,862 | 7/1954 | Camner . |
| 3,020,900 | 2/1962 | Hoffmann ............................... 123/276 |
| 3,079,901 | 3/1963 | Hallberg . |
| 3,154,059 | 10/1964 | Witzky et al. . |
| 3,498,276 | 3/1970 | Hardenberg ............................. 123/305 |
| 3,580,230 | 5/1971 | Hoffmann et al. . |
| 4,235,203 | 11/1980 | Thery . |

(List continued on next page.)

FOREIGN PATENT DOCUMENTS

| | | |
|---|---|---|
| 1 526 294 | 7/1969 | Germany . |
| 26 24 466 | 12/1976 | Germany . |
| 44 15 073 | 11/1995 | Germany . |
| 195 27 550 | 1/1997 | Germany . |
| 63-215816 | 9/1988 | Japan . |
| 63-227920 | 9/1988 | Japan . |
| 4-187816 | 7/1992 | Japan . |
| 1 196 782 | 7/1970 | United Kingdom . |
| WO 88/00280 | 1/1988 | WIPO . |

OTHER PUBLICATIONS

Kanper, Andrew B., "Modified I–C Engine Reaches Proposed 1980 Emission Goals", Automotive Engineering, Vol. 79, No. 2, pp. 20–23, Feb. 1, 1971.

*Primary Examiner*—Marguerite McMahon
*Attorney, Agent, or Firm*—Fletcher, Yoder & Van Someren

[57] ABSTRACT

A piston for a direct fuel injection engine is described. The piston comprises a cylindrical skirt and a piston face. The cylindrical skirt has an axis. The piston face has a bowl. The bowl has a wall extending about an axis in inclined relation to the cylindrical skirt axis. An engine is also described. The engine comprises an engine block defining an engine cylinder and a piston moveable axially in the engine cylinder. The piston comprises a cylindrical skirt and a dome-shaped piston face, the piston face having therein a bowl. The bowl located with the cylinder axis passing therethrough. The bowl is defined by a cylindrical wall extending about an axis extending in inclined relation to the axis of the cylinder. The bowl includes a bottom wall extending perpendicularly to the bowl axis. The engine also comprises a fuel injector nozzle adapted to direct a spray of fuel toward the bowl for deflection toward a spark plug disposed on the opposite side of the cylinder axis from the fuel injector.

11 Claims, 6 Drawing Sheets

U.S. PATENT DOCUMENTS

| | | |
|---|---|---|
| 4,286,557 | 9/1981 | Klomp . |
| 4,771,748 | 9/1988 | Chmela et al. .......................... 123/276 |
| 4,958,604 | 9/1990 | Hashimoto ............................... 123/305 |
| 4,974,565 | 12/1990 | Hashimoto et al. . |
| 5,107,810 | 4/1992 | Wu et al. . |
| 5,127,379 | 7/1992 | Kobayashi et al. ..................... 123/276 |
| 5,170,758 | 12/1992 | Chmela . |
| 5,553,588 | 9/1996 | Gono et al. ............................. 123/276 |
| 5,806,482 | 9/1998 | Igarashi et al. ......................... 123/276 |
| 5,813,385 | 9/1998 | Yamauchi et al. ...................... 123/279 |
| 5,816,215 | 12/1998 | Yoshikawa et al. .................... 123/305 |

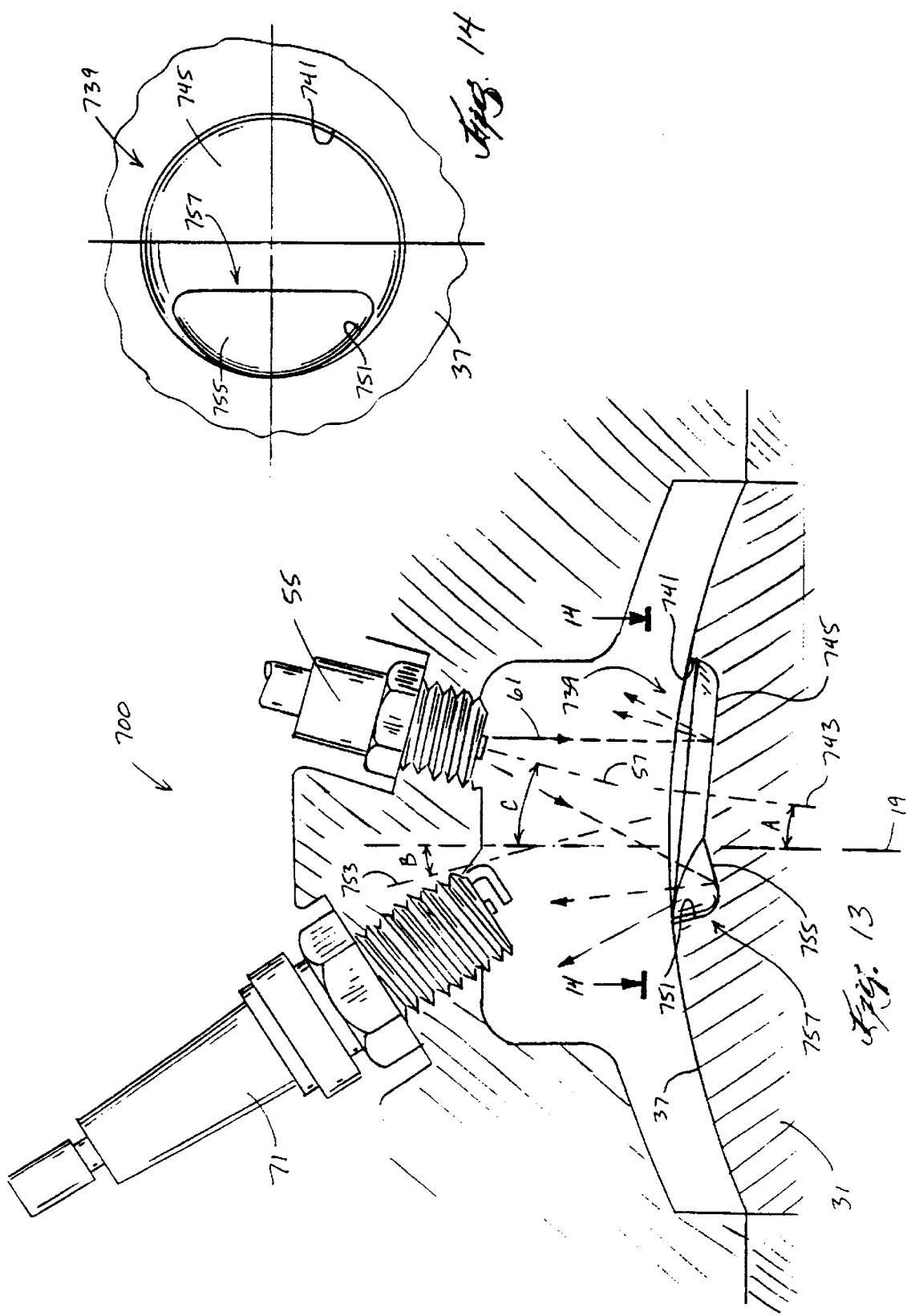

TWO-STROKE ENGINE PISTON BOWL CONFIGURATIONS

This application is a provisional of Ser. No. 60/013,673 filed Mar. 19, 1996, and a provision of Ser. No. 60/020,896 filed Jun. 27, 1996.

BACKGROUND OF THE INVENTION

The invention relates generally to two-stroke internal combustion engines and, more particularly, to piston face bowl configurations adapted to improve engine operation.

The invention also involves, in relation to the configuration of the piston face bowl, fuel injector and spark plug location.

Shown in FIG. 1 is a prior construction wherein a fuel injector or nozzle 1 is operative to direct a spray of fuel along the cylinder axis 2 and toward a bowl 3 in a piston face 4, which spray was reflected back by the bowl 3 in the direction toward the fuel injector or nozzle 1 in closely adjacent relation to the spray directed from the fuel injector or nozzle 1.

SUMMARY OF THE INVENTION

The invention provides improved piston bowl constructions for direct injected two-cycle engines. These constructions have various advantages, as explained below.

The invention provides a piston comprising a cylindrical skirt having an axis and an outer periphery, and a piston face extending from the outer periphery and having therein a bowl defined by an upstanding wall extending about an axis extending in inclined relation to the axis of the skirt.

The invention also provides an engine comprising an engine block including a cylindrical wall extending about an axis and defining an engine cylinder, a cylinder head fixed to the engine block, closing one end of the cylindrical wall, and including a recess registering with the engine cylinder, and a piston moveable axially in the engine cylinder and comprising a cylindrical skirt coaxial with the axis of the cylindrical wall and including an outer periphery, and a piston face extending from the outer periphery, defining with the cylinder head and with the cylindrical wall a combustion chamber, and having therein a bowl defined by a cylindrical wall extending about an axis extending in inclined relation to the axis of the cylindrical wall.

The invention also provides an engine comprising an engine block including a cylindrical wall extending about an axis and defining an engine cylinder, a cylinder head fixed to the engine block, closing one end of the cylindrical wall, and including a recess registering with the engine cylinder, a piston moveable axially in the engine cylinder and comprising a cylindrical skirt coaxial with the axis of the cylindrical wall and including an outer periphery, and a dome-shaped piston face extending from the outer periphery, defining with the cylinder head and with the cylindrical wall a combustion chamber, and having therein a bowl located with the cylinder axis passing therethrough, defined by a cylindrical wall extending about an axis extending in inclined relation to the axis of the cylindrical wall, and including a bottom wall extending perpendicularly to the bowl axis, a fuel injector nozzle mounted adjacent the recess of the cylinder head along an axis in inclined relation to the cylinder axis, in spaced relation to the cylinder axis, and adapted to direct a spray of fuel toward the bowl in the piston face for reflection thereby, and a spark plug mounted adjacent the recess of the cylinder head along an axis in inclined relation to the cylinder axis, in spaced relation to the cylinder axis, on the opposite side of the cylinder axis from the fuel injector, and in the path of fuel reflected from the bowl.

The invention also provides a piston for a fuel-injected engine, the piston comprising a piston face having therein a bowl shaped such that substantially all of the fuel striking the piston is directed to the side of the combustion chamber on which the spark plug is located.

The invention also provides a piston for a fuel-injected engine, the piston comprising a piston face having therein a large bowl, the large bowl having therein a small bowl.

The invention also provides a piston for a fuel-injected engine, the piston comprising a piston face having therein a bowl defined in part by a bottom wall having a central peak.

The invention also provides a piston for a fuel-injected engine, the piston comprising a piston face having therein a bowl formed by a rim extending upwardly from the face of the piston, the rim having a beveled inner corner.

The invention also provides a piston for a fuel-injected engine, the piston comprising a piston face having thereon a baffle dividing the combustion chamber into two sections.

The invention also provides a piston for a fuel-injected engine, the piston comprising a piston face having therein a bowl defined in part by a generally planar bottom wall which is non-perpendicular relative to the cylinder axis and which forms a main portion of the bowl, and defined in part by a generally planar wall forming a cut-out or recess in the main portion of the bowl.

The invention also provides an internal combustion engine comprising an engine block defining a cylinder, a cylinder head closing the cylinder and defining a combustion chamber, a fuel injector for injecting fuel into the combustion chamber, a spark plug for igniting fuel in the combustion chamber, and any of the above-described pistons.

DESCRIPTION OF THE DRAWINGS

FIG. 13 is a partial cross sectional view of a piston that is a seventh alternative embodiment of the invention.

FIG. 14 is a view taken along line 14—14 in FIG. 13.

Figure 1:
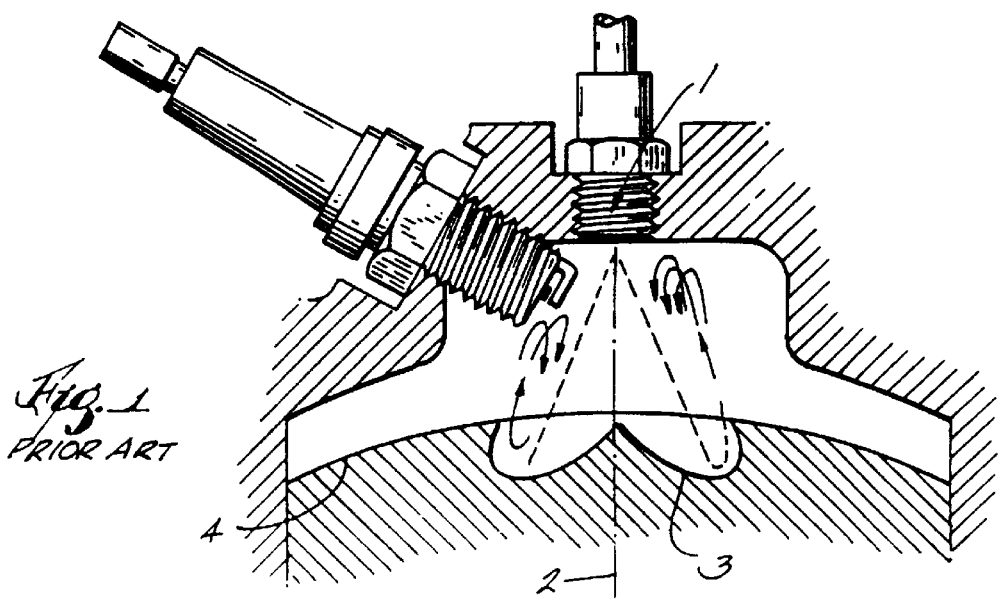
FIG. 1 is a fragmentary cross sectional view of a prior two-stroke internal combustion engine including an arrangement for injecting and reflecting fuel from a bowl in the piston face of the engine.

Before embodiments of the invention are explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENTS

Figure 2:
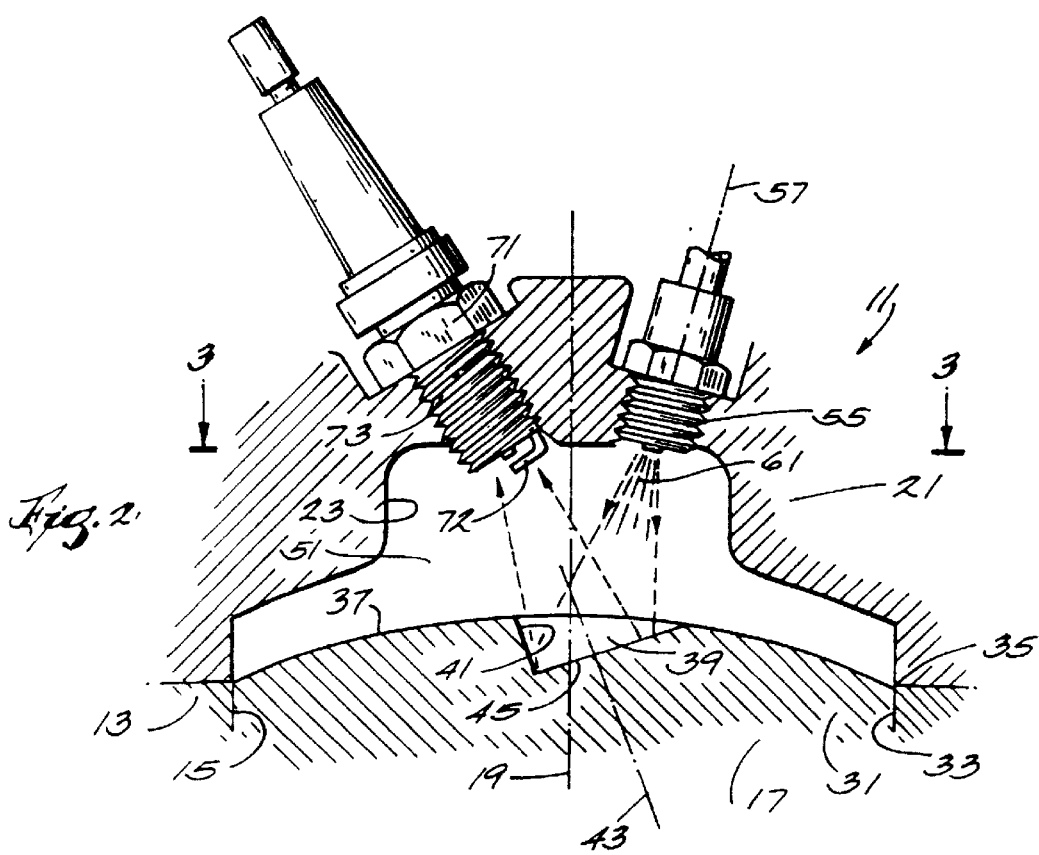
FIG. 2 is a fragmentary cross sectional view of a two-stroke internal combustion engine including an arrangement in accordance with the invention for injecting and reflecting fuel from a bowl in the piston face of the engine.

Shown fragmentarily in FIG. 2 is an internal combustion engine 11 which, preferably, is of the two-stroke type. The engine 11 comprises an engine block 13 including a cylindrical wall 15 defining an engine cylinder 17 which has an axis 19 and which is open at least at one end. The engine 11 also includes a cylinder head 21 which is suitably fixed to the engine block 13 to close off the open end of the engine cylinder 17 and which includes a recess 23 located in registry with the engine cylinder 17. The recess 23 can be of any suitable shape.

Located in the engine cylinder 17 for reciprocating movement therein along the cylinder axis 19 is a piston 31 including a cylindrical skirt 33 which is concentric with the cylinder axis 19 and which includes an outer periphery 35. The piston 31 also includes a piston face 37 which extends from the outer periphery 35, which is dome-shaped or crowned, which has therein a bowl or recess 39 defined by an upstanding wall 41 extending about an axis 43 located in inclined relation to the cylinder axis 19, and which includes a bottom wall or base 45 preferably extending perpendicularly to the bowl axis 43, and thus, at an angle other than perpendicular to the cylinder axis 19. While other angles could be employed, in the disclosed construction, the angle between the cylinder axis 19 and the axis 43 of the bowl 39 is preferably about 15 degrees. Preferably, the wall 41 is cylindrically shaped. In addition, it is noted that the cylinder axis 19 passes through one side of the bowl 39.

The piston face 37, together with the cylinder head 21 and the cylindrical wall 15, define a combustion chamber 51.

The engine 11 also includes a fuel injector or nozzle 55 mounted adjacent the recess 23 in the cylinder head 21, in communication with the combustion chamber 51, and in spaced relation to the cylinder axis 19. The fuel injector or nozzle 55 extends along an axis 57 in inclined relation to the cylinder axis 19, and is located to direct a spray 61 of fuel toward the bowl 39 in the piston face 37 for reflection thereby. Any suitable fuel injector can be used. While other angles could be employed, in the disclosed construction, the angle between the cylinder axis 19 and the axis 57 of the fuel injector or nozzle 55 is preferably about 10 to 15 degrees.

In addition, the engine 11 also includes a spark plug 71 which is mounted adjacent the recess 23 of the cylinder head 21 and which extends into the combustion chamber 51 and includes an electrode 72. The spark plug 71 extends along an axis 73 in inclined relation to the cylinder axis 19 and is located on the opposite side of the cylinder axis 19 from the fuel injector 71, in spaced relation to the cylinder axis 19, and in the path of fuel reflected from the bowl 39 in the piston face 37. While other angles could be employed, in the disclosed construction, the angle between the cylinder axis 19 and the axis 73 of the spark plug 71 is preferably about 30 degrees.

The disclosed construction of the bowl 39 (in the piston face of a direct fuel injected two-stroke engine) operates, in cooperation with the location of the fuel injector 55 and the spark plug 71, to deflect the fuel spray 61 within the combustion chamber 51 in a direction away from the fuel injector or nozzle 55 (as compared to directly back to or toward the nozzle, as in the prior art) and to the spark plug 71 which is located in the path of the deflected spray. More particularly, in the disclosed construction, the fuel sprayed from the fuel injector or nozzle 55 hits the bowl 39 and is deflected to an area in the combustion chamber 51 different from the area from which the fuel was sprayed, i.e., into the vicinity of the spark plug 71. The size, shape, and angle of the bowl 39 are chosen to control the direction of the reflected fuel spray. Because the reflected fuel spray is directed away from the fuel injector or nozzle 55, the spark plug 71 can be positioned away from the initial fuel spray, in a more desirable fuel/air mixture, whereby to improve low rpm running quality and low rpm fuel economy in two-stroke engines. The disclosed construction also serves to eliminate the problem of spark plug fouling due to liquid fuel droplets from the initial injector spray that build up on the spark plug electrode prior to ignition.

Figure 4:
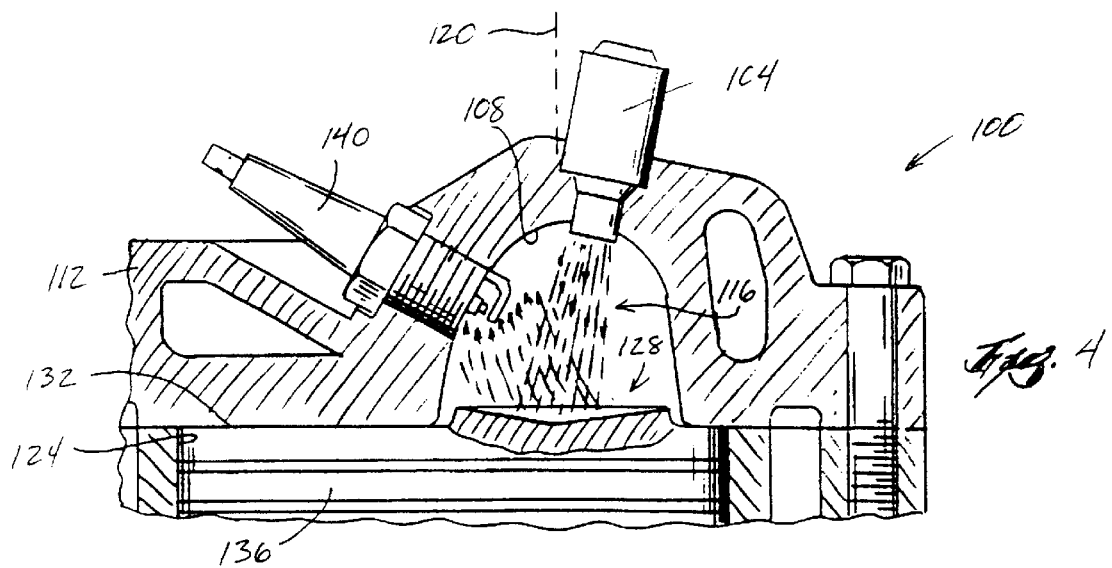
FIG. 4 is a partial cross sectional view of an engine that is a first alternative embodiment of the invention.

An engine 100 that is a first alternative embodiment of the invention is shown in FIG. 4. The engine 100 is a direct fuel injected two-stroke engine.

Within a direct fuel injected two-stroke engine it may be desirable, for reasons of reduced exhaust emissions, to operate the engine using stratified combustion. To this end, it is necessary to configure the combustion chamber such that control can be exercised over the injected fuel cloud, and hence the combustion process.

As shown in FIG. 4, the engine 100 has a bowl-in-head design in which the fuel injector 104 is located in the end of a relatively deep and narrow combustion chamber 108 in the cylinder head 112. The fuel spray 116 is injected at an angle of 10° to the axis 120 of the combustion chamber 108 and to the axis of the cylinder 124, and is directed towards a deflector/bowl 128 formed on the crown 132 of the piston 136. The deflector 128 is shaped such that all of the incident fuel striking the piston 136 is deflected to the side of the combustion chamber 108 containing the spark plug 140. A design such as this permits the spark plug to be somewhat removed from the direct injected spray, and thus plug wetting and fouling should be considerably reduced.

Figure 5:
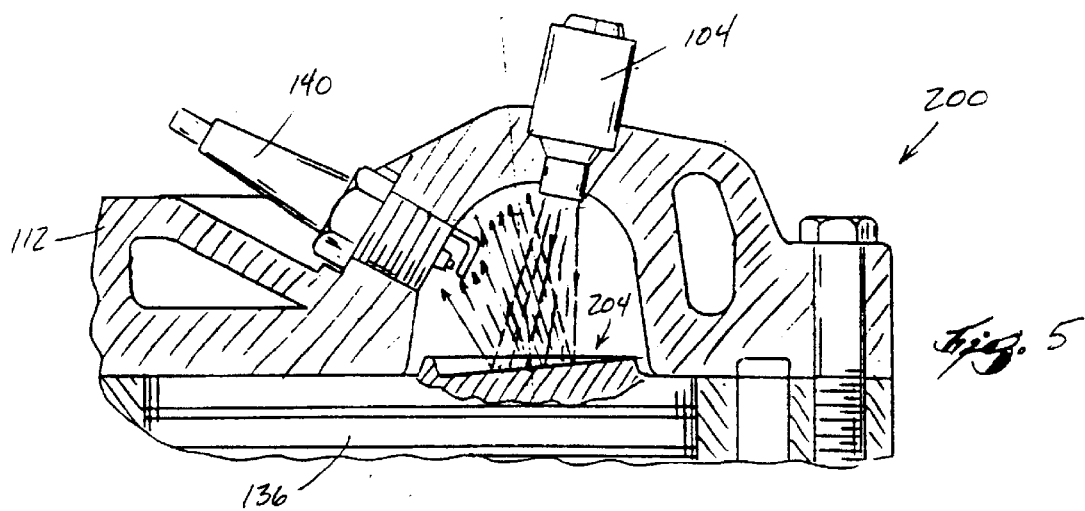
FIG. 5 is a partial cross sectional view of an engine that is a second alternative embodiment of the invention.

An engine 200 that is a second alternative embodiment of the invention is shown in FIG. 5. Except as described below, the engine 200 is identical to the engine 100, and common elements have been given the same reference numerals.

The engine 200 has an alternative piston deflector design using a full wedge shaped deflector 204, as shown in FIG. 5. This design will deflect the fuel spray more aggressively towards the spark plug 140.

An additional benefit of these designs (FIGS. 4 and 5) is that under full load operation, when relatively early injection timings are required, the 10° injector angle will tend to inject the fuel towards the center of the cylinder. This will promote more complete fuel/air mixing and reduce the possibility of cylinder wall wetting.

Figure 6:
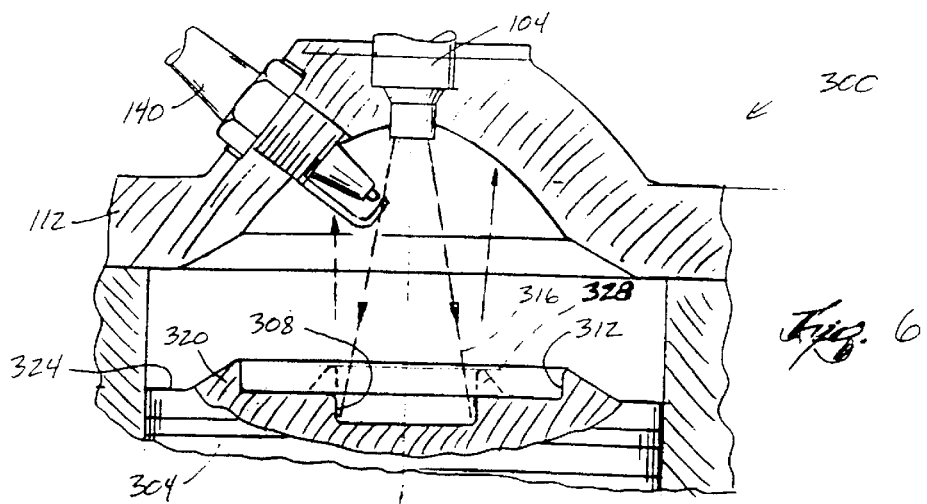
FIG. 6 is a partial cross sectional view of an engine that is a third alternative embodiment of the invention and that is operating under light load with the piston close to top dead center.
Figure 7:
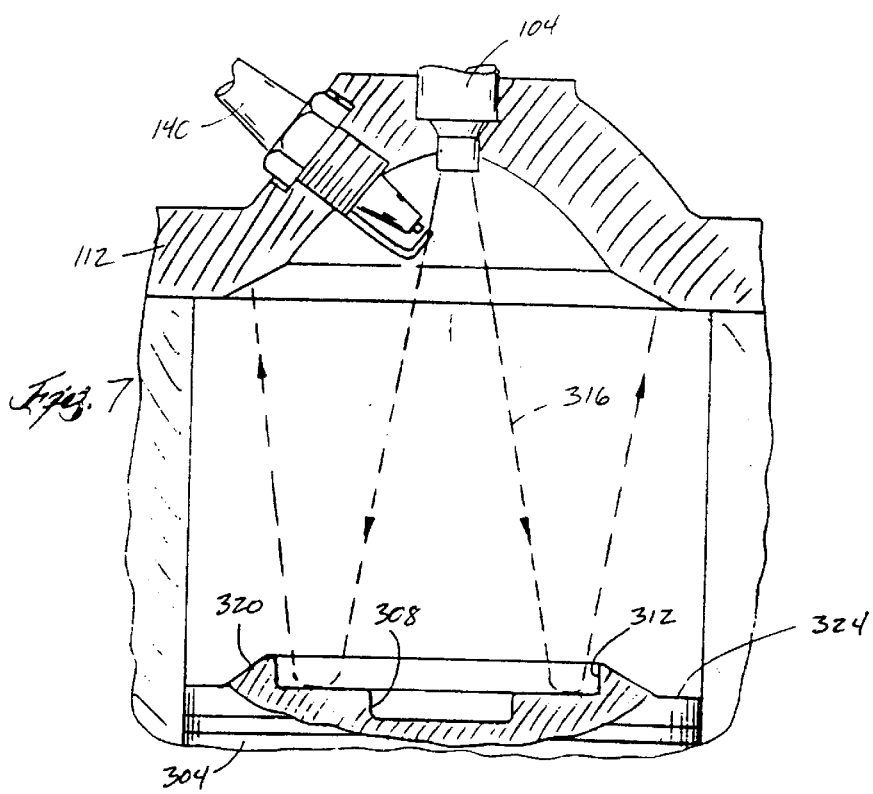
FIG. 7 is a view of the engine shown in FIG. 6 operating under heavy load with the piston close to bottom dead center.

An engine 300 that is a third alternative embodiment of the invention is shown in FIGS. 6 and 7. Elements in common with the engine 100 have been given the same reference numerals.

In engines equipped with direct cylinder fuel injection it is well known that best efficiency and lowest emissions are achieved under light load operation if the injected fuel is geometrically constrained in a compact, fuel rich zone and combusted in a stratified manner. Conversely, under heavy load conditions it is necessary to mix fuel with all the air trapped in an engine cylinder and to prevent stratification of fuel and air. In other words at light load a heterogeneous cylinder content is needed whereas at full load, homogeneity is required.

In engines of this type the required degree of stratification is achieved through geometric (piston and combustion chamber design) and phasing (relationship of piston crown to injection and ignition source) means. Geometric means ordinarily comprise bowls or deflectors on the piston crown to divert or redirect the momentum of fuel droplets which contact it. Phasing means typically take the form of changes in the relationship of the injection event to the piston position in the cylinder. Light load, heterogeneous, stratified operation is achieved by injecting fuel when the piston is near its top dead center position. Heavy load, homogeneous operation is achieved by injecting fuel when the piston is nearer its bottom dead center position.

In either case it is known that fuel droplets possess sufficient momentum to impact the piston prior to combustion. It is also known that altering the contour of the piston crown can advantageously redirect the fuel droplets back toward the cylinder head, preventing their diffusing into the distant regions of the combustion space.

To provide for proper redirection of the injected fuel spray under different operating conditions, in which optimum injection timing is varied relative to piston position, the engine 300 includes a piston 304 equipped with at least two bowls 308 and 312 of different sizes, the bowl 308 being within the bowl 312. The larger, deeper bowl 312 is useful in intermediate and higher loads (FIG. 7) when injection occurs early and the spray cone 316 is more dispersed before it reaches the piston 304, further down the bore. The bowl 312 is formed by and surrounded by a rim 320 extending upwardly from the piston face 324. The smaller, shallower bowl 308, located in the floor of the larger bowl 312, is useful for light load operation (FIG. 6) where injection occurs later, with the piston nearer top dead center, and the spray cone is less diffused. Optionally, the bowl 308 can be surrounded by a rim 328 (shown in phantom in FIG. 6).

Figure 8:
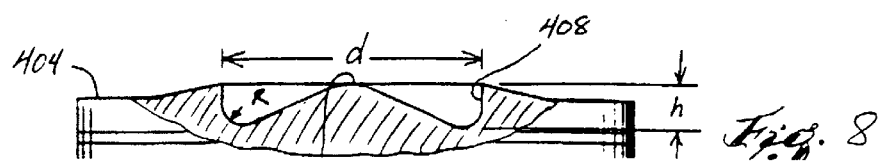
FIG. 8 is a partial cross sectional view of a piston that is a fourth alternative embodiment of the invention.

A piston 400 that is a fourth alternative embodiment of the invention is shown in FIG. 8. The piston 400 has a crown profile for an internal combustion engine cylinder which is fueled by a liquid-only direct cylinder fuel injection system.

The face 404 of the piston 400 has a bowl 408 shaped as shown in FIG. 8. Diameter "d" defines the cross-sectional area of the injector spray plume at a height in the cylinder corresponding to the top of the exhaust port. Height "h" is in the range 5–7 mm. Radius "R" is typically half (or less) of height "h". The central portion of the bowl 408 is a solid cone with a rounded apex 412 and a height greater or equal to the bowl rim height "h".

The purpose of the bowl 408 is to catch and contain fuel as emitted from an injector in a hollow cone shaped pattern. Such fuel is subsequently carried upward in the cylinder and ultimately thrown vertically due to the piston's rapid deceleration.

The bowl 408 differs from similar bowls in the shape and function of the central peak 412. Such similar designs include the deep and sometimes re-entrant bowls commonly found in diesel engines. These function to promote a high intensity toroidal gas vortex. Similar designs also include the bowl disclosed in U.S. Pat. No. 5,209,200.

The peak 412 has a number of important attributes:
(1) It forms an oblique angle of incidence for the impacting spray thus reducing the tendency for the spray to splash out of the bowl but rather to flow down the ramp into the outer annular area.
(2) Increased surface to volume ratio.
(3) Increased heat capacity of the central area. This will increase the cyclic heat available in the piston for fuel vaporization.
(4) Reduced tendency (compared to a flat-bottomed bowl) for the liquid fuel to remain stationary and form droplets on the bottom surface of the bowl. Instead, as the piston decelerates rapidly, liquid fuel contained in the annular channel will be forced to either: (a) flow vertically up to the outer wall of the bowl, leaving the edge as a thin sheet (this liquid will then be atomized by the gas flowing radially inward under the action of "squish"; or (b) flow upward and radially inward towards the apex of the central peak. In so doing, it will ensure that this hot metal surface is continually wetted thus promoting rapid liquid vaporization. This has the added benefit of improved piston crown cooling in this critical area which would not otherwise be wetted by a hollow-cone spray.

The maximum benefit is from the imposed increase in overall combustion chamber surface to volume ratio.

Figure 10:
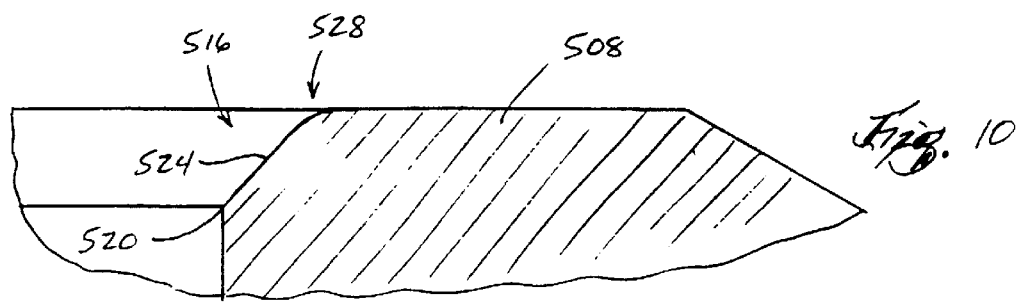
FIG. 10 is an enlarged portion of FIG. 9.
Figure 9:
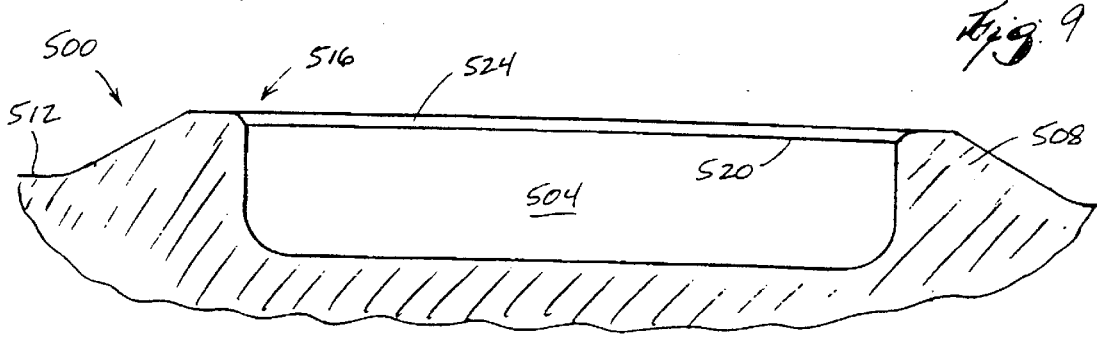
FIG. 9 is a partial cross sectional view of a piston that is a fifth alternative embodiment of the invention.

A piston 500 that is a fifth alternative embodiment of the invention is shown in FIGS. 9 and 10.

The piston 500 includes a bowl 504 formed by a rim 508 extending upwardly from the face 512 of the piston 500. The rim 508 differs from known rims in that the inner corner 516 of the rim 508 is beveled (best shown in FIG. 10) at an angle of approximately 45 degrees with a sharp corner 520 at the bottom of the beveled surface 524 and with a radius 528 at the top of the beveled surface 524. This construction has been found to provide improved performance of direct injected two-cycle engines.

Figure 11:
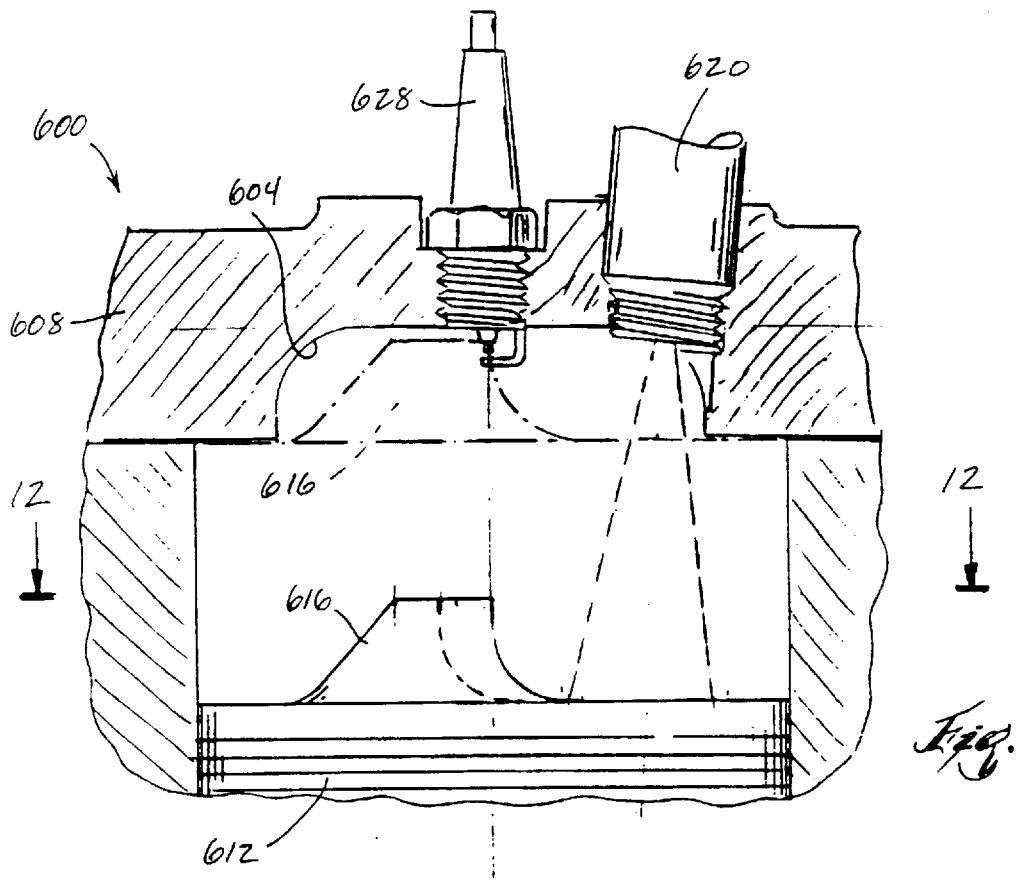
FIG. 11 is a partial cross sectional view of an engine that is a sixth alternative embodiment of the invention.
Figure 12:
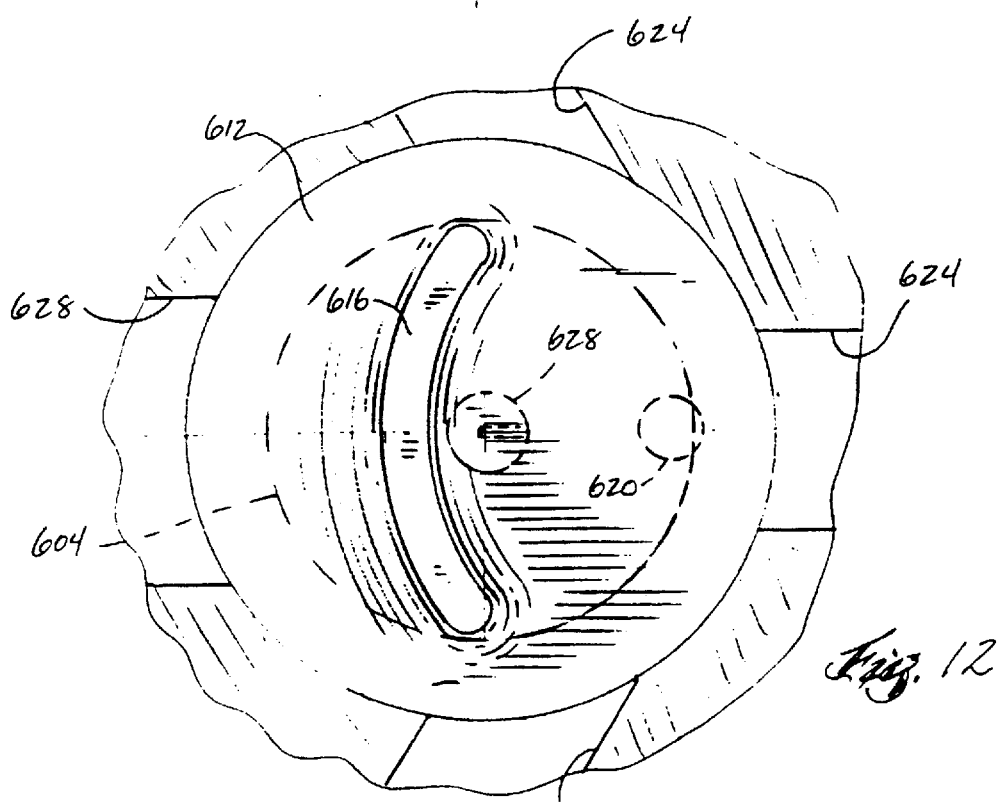
FIG. 12 is a view taken along line 12—12 in FIG. 11.

An engine 600 that is a sixth alternative embodiment of the invention is shown in FIGS. 11 and 12.

With a single fluid injection system and an injector directed downward toward the piston, it is virtually inevitable that the liquid spray will hit the piston. The purpose of this engine construction is to minimize the short circuited fuel, and to provide a degree of charge stratification. In this construction, shown in FIGS. 11 and 12, the combustion chamber 604 in the cylinder head 608 is preferably a flat-topped recess. The piston 612 is also flat-topped except for a raised ridge 616 which extends across the head recess 604 when the piston is at top dead center (shown in phantom in FIG. 11). The ridge 616 is effectively a baffle dividing the combustion chamber 604 into two sections. This ridge or baffle 616 is not intended to play any role in the conventional Schnuerle or loop scavenging system, and it can be sized and located to avoid, or at least minimize, any effect on scavenge flow. The baffle 616 is intended only to control the flow during the injection of the fuel and during the compression and ignition of the charge. The fuel injector 620 is located so as to spray fuel on the piston on the side of the baffle 616 toward the inlet or transfer ports 624 (to the right in FIG. 11), and the baffle 616 prevents fuel from splashing or ricocheting toward the exhaust port 628. As the piston ascends, the baffle 616 will help to keep the fuel vapor, which is evaporating from the hot piston, on the inlet side of the cylinder. As the piston approaches top dead center, and squish begins to occur, the combustion chamber 604 will be more distinctly divided with the bulk of fuel vapor still on the inlet side, forming a richer zone in which to initiate combustion. The squish on this side of the piston top will tend to scrub the top of the piston of any remaining fuel, and this fuel will be forced up toward the spark plug 628 by the baffle 616.

The advantage of this combustion chamber is the minimization of fuel carried out the exhaust port, and the stratification of the combustion charge with consequent improvement in ignition and combustion efficiency. Another means that has been used to achieve some of these effects is a cup in the piston, but that type of system cannot have the same influence on the squish action, and it may be difficult to scavenge the interior of the cup.

Figure 3:
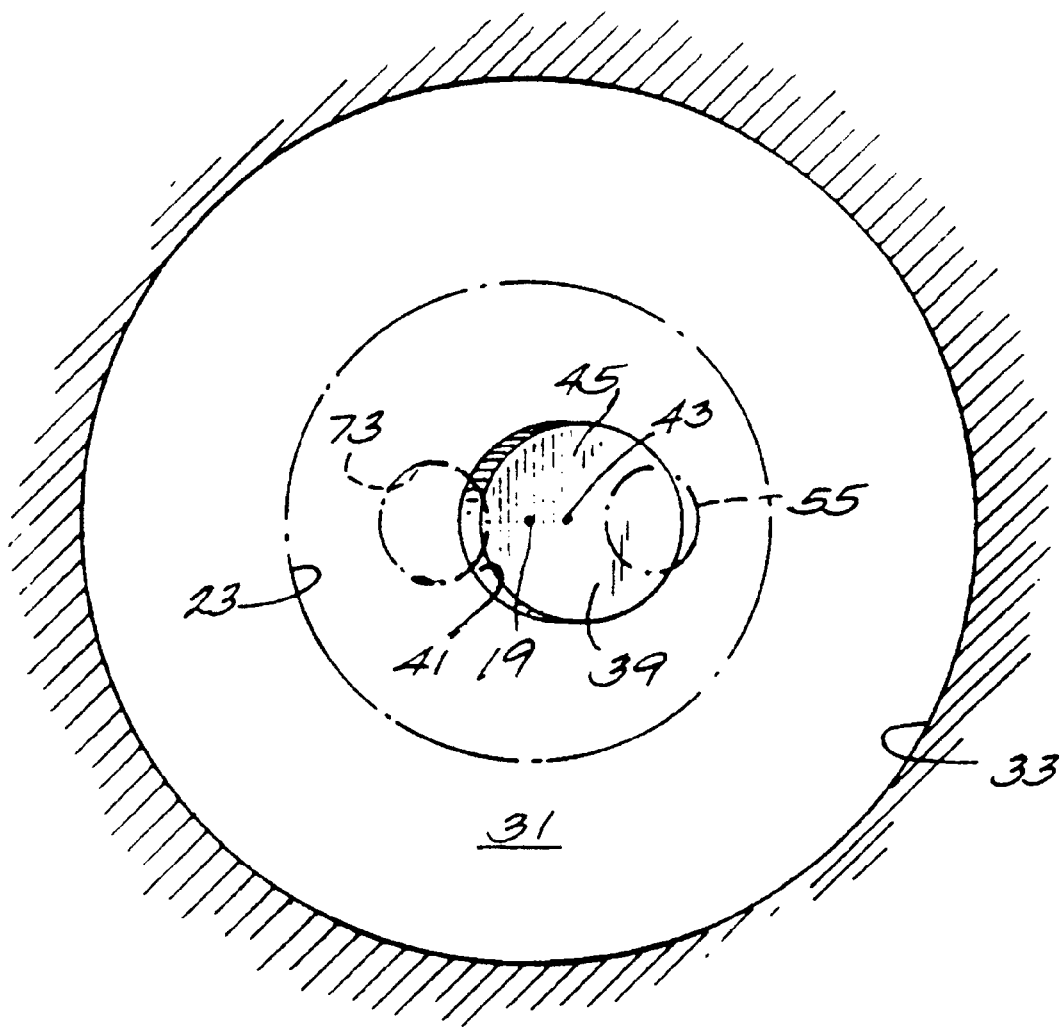
FIG. 3 is a view taken along line 3—3 in FIG. 2.

An engine 700 that is a seventh alternative embodiment of the invention is shown in FIGS. 13 and 14. The engine 700 is a variation of the engine 11 shown in FIGS. 2 and 3, and common elements have been given the same reference numerals.

The engine 700 includes a piston 31. The face 37 of the piston 31 has therein a bowl or recess 739 defined in part by a wall 741 that forms a portion of a cylinder centered on an axis 743 located in inclined relation to the cylinder axis 19. While other angles could be employed, in the disclosed construction, the angle A between the cylinder axis 19 and the axis 743 is preferably about six degrees. The bowl is also defined in part by a generally planar bottom wall or base 745 preferably extending perpendicular to the axis 743. The walls 741 and 745 form a main portion of the bowl 739. Preferably, the main portion of the bowl is formed with a rotary drilling or cutting stool (not shown) rotating about the axis 743. The bowl is also defined in part by a wall 751 that forms a portion of a cylinder centered on an axis 753. The axis 753 is located in the same plane as the axes 19 and 743 and is inclined relative to the cylinder axis 19. While other angles could be employed, in the disclosed construction, the angle B between the cylinder axis 19 and the axis 753 is preferably about fifteen degrees. The axis 753 is inclined in the opposite direction relative to the axis 743, so that the angle between the axes 743 and 753 is preferably about twenty-one degrees. The bowl is also defined in part by a generally planar wall 755 preferably extending perpendicular to the axis 753. As shown in FIGS. 13 and 14, the walls 751 and 755 form a cut-out or recess 757 in the main portion of the bowl 739. As shown in FIG. 13, the recess 757 is angled in the opposite direction relative to the main portion of the bowl. The reason for this is explained below. Preferably, the cut-out 757 is formed with a rotary drilling or cutting tool (not shown) rotating about the axis 753.

The fuel injector or nozzle 55 extends along an axis 57 in inclined relation to the cylinder axis 19. While other angles could be employed, as shown in FIG. 13, the angle C between the cylinder axis 19 and the axis 57 of the fuel injector 55 is preferably about fifteen degrees. The fuel injector is located to direct a spray 61 of fuel toward the bowl 739 for reflection thereby. The main portion of the bowl 739 reflects fuel generally back toward the fuel injector 55. Because the recess 757 is angled in the opposite direction, the recess 757 reflects fuel toward the spark plug 71. Thus, the bowl 739 provides "divided reflection."

What is claimed is:

1. A piston, comprising:
  a cylindrical skirt having a first axis and an outer periphery and;
  a dome-shaped piston face extending from the outer periphery and having therein a bowl defined by an upstanding wall extending about a second axis, the second axis extending in inclined relation to the first axis of the skirt and a bottom wall extending generally perpendicularly to the second axis.

2. A piston in accordance with claim 1 wherein the first axis of the skirt passes through the bowl.

3. A piston in accordance with claim 1 wherein the upstanding wall is cylindrically shaped.

4. An engine comprising:
  an engine block, including an engine cylinder extending about an engine cylinder axis;
  a cylinder head fixed to the engine block, closing one end of the engine cylinder; and
  a piston moveable axially in the engine cylinder and comprising:
    a cylindrical skirt, having an outer periphery, coaxial with the engine cylinder axis;
    a dome-shaped piston face extending from the outer periphery, having therein a bowl defined by a cylindrical wall extending about a bowl axis, the bowl axis extending in inclined relation to the engine cylinder axis.

5. An engine in accordance with claim 4, comprising:
  a fuel injector nozzle disposed in the cylinder head along an axis in inclined relation to the engine cylinder axis, the nozzle being adapted to direct a spray of fuel toward the bowl in the piston face for deflection thereby; and
  a spark plug disposed in the cylinder head along an axis in inclined relation to the engine cylinder axis, and in the path of fuel deflected from the bowl.

6. An engine in accordance with claim 4 wherein the bowl includes a bottom wall extending substantially perpendicularly to the bowl axis.

7. An engine in accordance with claim 4 wherein the axis of the cylinder passes through the bowl.

8. An engine, comprising:
  an engine block including a cylindrical wall extending about a cylinder axis and defining an engine cylinder;
  a cylinder head fixed to the engine block, closing one end of the cylindrical wall, and including a recess register with the engine cylinder;
  a piston moveable axially in the engine cylinder and comprising:
    a cylindrical skirt coaxial with the axis of the cylindrical wall and including an outer periphery, and
    a dome-shaped piston face extending from the outer periphery, defining with the cylinder head and with the cylindrical wall a combustion chamber, and having therein a bowl located with the cylinder axis passing therethrough, defined by a bowl wall extending cylindrically about a bowl axis, the bowl axis extending in inclined relation to the axis of the cylindrical wall, and including a bottom wall extending perpendicularly to the bowl axis;
  a fuel injector nozzle mounted adjacent the recess of the cylinder head along an axis in inclined relation to the cylinder axis, in spaced relation to the cylinder axis, and adapted to direct a spray of fuel toward the bowl in the piston face for deflection thereby; and
  a spark plug mounted adjacent the recess of the cylinder head along an axis in inclined relation to the cylinder axis, in spaced relation to the cylinder axis, and in the path of fuel deflected from the bowl.

9. A piston for a fuel-injected engine, comprising:
  a dome-shaped piston face having therein a bowl, having a generally planar bottom wall portion, that is shaped such that substantially all of the fuel striking the piston is directed to the side of the combustion chamber on which the spark plug is located.

10. A piston as set forth in claim 9 wherein the bowl is defined in part by inwardly and downwardly converging wall portions.

11. An internal combustion engine, comprising:

an engine block defining a cylinder;

a cylinder head closing the cylinder and defining a combustion chamber;

a fuel injector for injecting fuel into the combustion chamber;

a spark plug for igniting fuel in the combustion chamber; and a piston comprising a piston face having therein a bowl shaped such that substantially all of the fuel striking the piston is directed to the side of the combustion chamber on which the spark plug is located, a dome-shaped piston face having therein a bowl, having a generally planar bottom wall portion, that is shaped such that substantially all of the fuel striking the piston is directed to the side of the combustion chamber on which the spark plug is located.

* * * * *